Patented Nov. 22, 1949

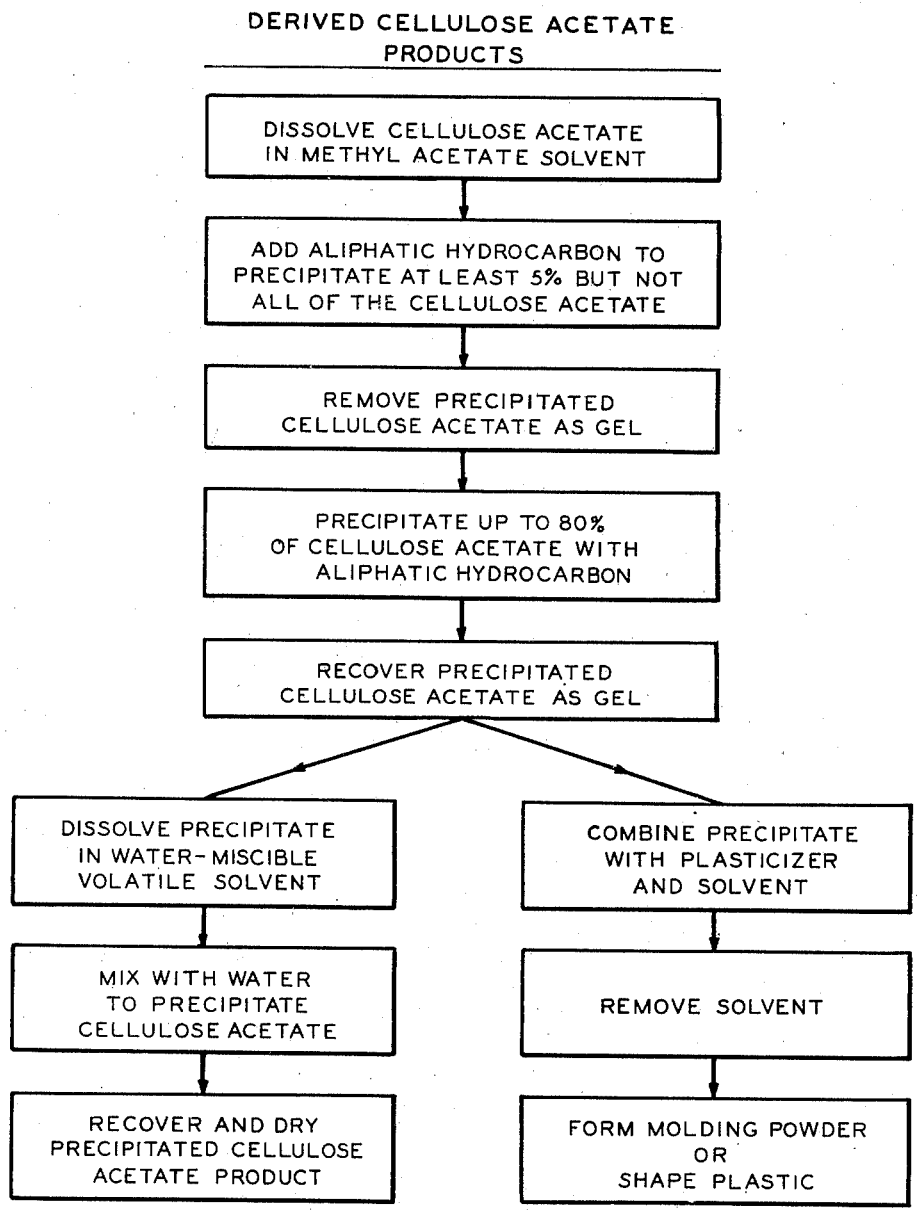

2,489,143

UNITED STATES PATENT OFFICE 2,489,143

PROCESS FOR THE PREPARATION OF AN OPTICALLY CLEAR CELLULOSE ACETATE FRACTION

Joseph Wayne Kneisley, New Brunswick, N. J., assignor to Hercules Powder Company, Wilmington, Del., a corporation of Delaware Application November 24, 1945, Serial No. 630,681

10 Claims. (Cl. 260—230)

This invention relates to a novel process for the preparation of a derived cellulose acetate material capable of producing substantially colorless, optically clear plastic compositions.

There has been a serious need for a tough, colorless, completely transparent plastic sheeting, especially in the aeronautical field. For example, such plastic sheeting is required for cockpit canopies, gun turrets, nose sections, windows, etc. To date, there have been only two types of plastics which have been found generally useful for such purposes, the one type being the acrylate plastics, and the other being the cellulose acetate plastics. The acrylate plastics are characterized by having excellent light transmission properties and freedom from the defect of scattering light. However, they have poor impact strengths at all temperatures and particularly at the very low temperatures encountered at high altitudes. Despite these deficiencies, the acrylate plastics are used wherever optical clarity is required.

Cellulose acetate plastics, on the other hand, are employed to some extent because of their superior toughness and flexibility. For some purposes, these properties are sufficiently important to compensate for the relatively poor optical properties of the cellulose acetate. No cellulose acetate plastic heretofore has had a sufficiently good color and freedom from apparently inherent light-scattering effects so that it might be characterized as optically clear and usable where optical clarity and colorlessness are required. Nor has any known method of improving cellulose acetate, such as by filtration, eliminated the light-scattering characteristic.

It has now been found that, contrary to previous beliefs, a cellulose acetate not having the usual characteristic light-scattering and color properties can be prepared. It has now been found that cellulose acetate as prepared is not entirely homogeneous but consists of several colloidal fractions. It now appears that only certain of these fractions have the effect of imparting color and scattering light.

In accordance with this invention, it has been found that cellulose acetate plastics, which are substantially completely colorless and which possess optical clarity, can be prepared by a fractionation process in which cellulose acetate is dissolved in a methyl acetate solvent and precipitated therefrom in fractions by certain hydrocarbons to obtain an intermediate fraction in the form of a gel which may then be worked up into the derived cellulose acetate or plastic.

The fractionation procedure comprises the steps of (a) dissolving cellulose acetate in a solvent containing at least 50% methyl acetate, (b) adding an aliphatic hydrocarbon of from 3 to 7 carbon atoms as a liquid precipitant or coagulant, miscible with the solvent and capable of precipitating the cellulose acetate in gelatinous form, the amount of hydrocarbon added being such as to precipitate at least about 5% of the cellulose acetate originally dissolved but being less than an amount which will precipitate all or nearly all of the cellulose acetate, (c) permitting this first precipitate to coagulate and removing it from the solution, (d) adding additional precipitant to the solution in such an amount as to precipitate not more than about 80% of the cellulose acetate originally dissolved while, at the same time, leaving at least about 2% of the cellulose acetate originally dissolved in the solution, and (e) permitting this second precipitate to coagulate with the formation of a gelatinous mass, and recovering it from the solution.

This procedure isolates from the original cellulose acetate a derived methyl acetate-soluble fraction, free of color-forming and light-scattering colloidal fractions, such undesired fractions being concentrated in the initial precipitate and in the residual solution. The derived fraction at this point is in the form of a more or less translucent gelatinous mass containing cellulose acetate, methyl acetate solvent, and hydrocarbon coagulant. It may be converted to an acetate flake by further treatment, or it may be converted to an acetate plastic without the isolation of a dry cellulose acetate.

Where it is desired to isolate the derived cellulose acetate fraction, the gelatinous material recovered from the fractionation procedure is mixed with a cellulose acetate solvent in an amount to form a solution having a concentration of above 3% but less than 25% cellulose acetate. The resulting solution is then mixed with sufficient water to precipitate the cellulose acetate content. It has been found that, although water cannot coact with methyl acetate in the original fractionation to bring about isolation of a product devoid of light-scattering colloidal fractions and although water-precipitated cellulose acetate has always had an undesirable light-scattering property, nevertheless, it is operative to precipitate the derived cellulose acetate fraction from its solution in active solvent and residual hydrocarbon without damage to optical properties. The derived fraction is thus precipitated as a flake and is dried. The resulting dry flake can be converted into optically clear, colorless plastics by the usual methods for preparing plastic masses, provided that care is taken to use clean equipment, pure, colorless additives, and moderate temperatures for processing.

The gelatinous derived fraction recovered from the fractionation procedure is more conveniently converted into a plastic mass by mixing it with a cellulose acetate plasticizer, with or without the addition of cellulose acetate solvent to aid in homogenizing the mixture. The plasticized acetate fractionation mixture may be treated to eliminate all volatile materials and brought to the form of a molding powder, or it may be cast into films, extruded, or otherwise shaped, with subsequent removal of the volatile materials. The volatile materials can, of course, be removed before final shaping, if desired.

Alternatives in accordance with the invention are outlined diagrammatically in the flow sheet given in the drawing. The examples following illustrate specific procedures.

*Example 1*

A solution was prepared by dissolving 200 grams of cellulose acetate having a combined acetic acid content of 52.4% and a viscosity of 42 seconds in 3780 grams of redistilled methyl acetate. To this solution there was added, with rapid agitation, 160 grams of normal pentane. Continuing the agitation, there was then added 600 grams of a mixture of equal parts by volume of methyl acetate and normal pentane. At this point, the solution became distinctly cloudy. An additional 150 grams of the said methyl acetate-pentane mixture was then added with further agitation. Upon completion of this addition, the mixture was permitted to stand overnight. The precipitated material settled to the bottom of the container vessel in the form of a gel. The supernatant liquor was siphoned away from the gel. The supernatant liquor so recovered was then treated by adding with agitation 1850 grams of normal pentane. A precipitate immediately formed and settled fairly rapidly, forming a translucent, jellylike layer on the bottom of the container vessel. This layer was recovered by decanting the supernatant liquor and represented the desired cellulose acetate product. The desired product so obtained contained 75.5% of the original cellulose acetate utilized. The initial precipitate, first removed, contained 21.5% of the original cellulose acetate. The final supernatant liquor contained in solution 3% of the original cellulose acetate.

*Example 2*

The derived cellulose acetate gel product obtained in Example 1 was put into solution by adding methyl acetate until the resulting mixture weighed 755 grams and stirring the mixture. In this manner, a 20% solution was obtained. To this solution was added 68 grams of dimethyl phthalate to arrive at a cellulose acetate : plasticizer ratio of 100:45. Films were then cast from the resulting solution and permitted to dry in a dust-free atmosphere. The films varied somewhat in thickness between 0.005 and 0.030 of an inch. The dried films were cut into 2-inch discs and a number of such discs were stacked and welded together at 2000 lb./sq. in. pressure for 15 minutes to form a plastic disc ½ inch thick. The disc so obtained was found to have the following optical properties:

Pulfrich opacity value _____ per cent__ 0.30
Brightness value _____ do____ 88.50
Excitation purity value _____ do____ 3.50
Trichromatic coefficients:
    $x$ _____ 0.3155
    $y$ _____ 0.3240
Dominant wave length _____ m$\mu$__ 573

*Example 3*

The procedure of Example 1 was repeated, substituting normal hexane for the normal pentane. Results were substantially the same, the initial gel fraction separated constituting 27% of the original cellulose acetate, the desired second gel fraction recovered constituting 68.5% of the original cellulose acetate, and the final supernatant liquor containing in solution 4.5% of the original cellulose acetate.

*Example 4*

The derived cellulose acetate product recovered as a gel fraction in Example 3, and containing 137 grams of cellulose acetate, was stirred into a quantity of acetone sufficient to bring the resulting solution to 900 grams. Water was slowly stirred into the resulting solution until the initial precipitate which formed redissolved quite slowly. A large quantity of water was then rapidly agitated with the mixture to precipitate the cellulose acetate. The precipitated product was washed once with distilled water and dried under vacuum at a temperature of 60° C. Colloided with dimethyl phthalate with the aid of a small amount of acetone in clean equipment at relatively low temperatures, this flake product gave plastics comparable in appearance to the disc obtained in accordance with Example 2.

The fractionation method in accordance with this invention is applicable to any cellulose acetate which is soluble in the methyl acetate or methyl acetate-containing solvent employed. In general, the cellulose acetate will be in the usual flake or fibrous form and will have a combined acetic acid content from about 50% to about 59%. The solvent employed for the fractionation dissolves the cellulose acetate employed and contains, as the essential active ingredient, methyl acetate to the extent of at least 50% by weight of the solvent. Thus, methyl acetate, mixtures of methyl acetate with lower ketones such as acetone, methyl ethyl ketone, and methyl isopropyl ketone, or mixtures of methyl acetate with lower aliphatic alcohols such as methyl alcohol, ethyl alcohol, and isopropyl alcohol, or mixtures of methyl acetate with other lower aliphatic alcohol-lower fatty acid esters such as ethyl acetate and ethyl formate have been found suitable as solvents.

The cellulose acetate is dissolved in the solvent in a concentration which may vary rather widely, for example, between 1% and 15%, depending upon the type of cellulose acetate employed. Practical considerations, such as time required for precipitation and settling, will usually control. In general, a concentration between about 3% and about 7% is most convenient.

After the cellulose acetate has been dissolved in the solvent, a portion is precipitated by addition of an aliphatic hydrocarbon of from 3 to 7 carbon atoms. The hydrocarbon is preferably added slowly with thorough agitation of the mixture. The amount added depends upon the particular solution treated. However, enough hydrocarbon will be added to effect precipitation of at least about 5% of the cellulose acetate originally dissolved. This constitutes a critical minimum limit which must be precipitated in order to obtain ultimate plastics substantially colorless and of optical clarity. Optimum results are obtained when the hydrocarbon is sufficient to precipitate at least 15% of the cellulose acetate, say from 15% to 60%, in this first fraction. However, the hydrocarbon precipitant will be added in an amount less than that which precipitates all or nearly all of the cellulose acetate in solution, since the desired product must remain in solution at this stage. Thus, the hydrocarbon will be added in an amount less than sufficient to bring about precipitation of 80% or more of the cellulose acetate present.

It has been found that, although there are a very large number of substances which can precipitate cellulose acetate from methyl acetate solutions, only certain precipitants, for reasons unknown, permit practical recovery of fractions capable of forming optically clear plastics. Thus, such common precipitants as water and the lower aliphatic alcohols fail to give such products possibly because their oxygen-containing groups either affect the acetate precipitated or because the oxygen groups prevent coaction with methyl acetate to give selective fractionation. The hydrocarbons are unique as precipitants.

The precipitants to be employed in accordance with this invention are the aliphatic hydrocarbons of from 3 to 7 carbon atoms, such as propane, normal butane, isobutane, normal pentane, isopentane, tetramethylmethane, normal hexane, ethyl isobutane, diisopropane, trimethylethylmethane, normal heptane, cyclopentane, cyclohexane, cycloheptane, etc., and mixtures thereof, such as petroleum ether, naphtha, commercial hexane, etc., with normal pentane, normal hexane, and petroleum ether being preferred. It will be understood that the particular precipitant employed must be completely miscible with the cellulose acetate solvent employed or sufficiently miscible to provide homogeneous solutions when the amounts of precipitant required in accordance with this invention are added. Precipitation must be carried out under pressure where propane and the butanes are used to maintain the precipitant in the liquid state, and, while this has some disadvantages, it permits separation of precipitant from the various resulting fractions merely by release of pressure. It will further be apparent that the actual precipitating liquid employed may be one of the precipitants mentioned, diluted partially with the cellulose acetate solvent previously employed.

As illustrated in Example 1, the precipitant is preferably added with agitation of the cellulose acetate solution. As the precipitant is added, the solution becomes very cloudy. When agitation is stopped and the mixture allowed to stand, what appears to be a precipitate of opaque solid particles settles and coalesces to form a more or less uniform gel. It generally takes from ½ to 8 hours for this first gel fraction to settle out. The time involved will vary, depending upon the viscosity of the mixture and the amount of the precipitate. After the precipitate has coagulated, it may be removed by decantation, siphoning, centrifuging, or the like.

A second gel fraction is then precipitated by adding sufficient additional precipitant with agitation of the solution to precipitate a quantity not more than about 80% of the cellulose acetate originally dissolved, preferably not more than about 75%. Care must be taken at this point that too much of the cellulose acetate in the solution is not precipitated. It is essential that only such amounts of cellulose acetate be precipitated as to insure that there remains in solution at least about 2%, and preferably about 5%, of the cellulose acetate originally dissolved. As first precipitated, the desired material separates out in suspended flocculent particles. These particles, however, coalesce to form a homogeneous, more or less translucent gel consisting of cellulose acetate, methyl acetate, and hydrocarbon. The second gel fraction may be recovered in any desired manner, as, for example, by siphoning off the mother liquor.

For practical purposes, it is sufficient to separate the cellulose acetate employed as starting material into three fractions; namely, a first fraction which is entirely unsatisfactory for preparing clear plastics, a second fraction from which colorless plastics of optical clarity are prepared, and a final or residual fraction which remains dissolved after removal of the first two fractions. However, if desired, additional intermediate fractions can be obtained by controlling the amount of precipitant added, and it will be appreciated that any one or any combination of the intermediate fractions (after elimination of the first 5% or more) will produce plastics of optical clarity. The operable and preferred ranges for the separation of the original cellulose acetate into fractions are as follows:

|  | Operable | Preferred |
|---|---|---|
| First Fraction | At least 5% | At least 15%. |
| Second Fraction or Total of Intermediate Fractions. | Not more than 80%. | Not more than 75%. |
| Residual Fraction | At least 2% | At least 5%. |

The first fraction can be precipitated in portions, if desired. In such case, the term "first fraction" will be inclusive of portions totaling not less than 5% of the original cellulose acetate, separated prior to precipitation of the desired fraction capable of optically clear product formation, and the term "second fraction" will refer to desired product precipitated after previous removal of at least 5% of the original cellulose acetate.

The second fraction, or other intermediate fraction, in all cases is the desired product capable of forming optically clear and colorless cellulose acetate articles. The first gel fraction yields cellulose acetate suitable only where clarity is not required. The residual fraction remaining in solution can be recovered by precipitation therefrom or evaporation for use where a product of poor color and lowered stability is acceptable.

Where it is desired to isolate the derived cellulose acetate fraction as a dry flake, the gelatinous material recovered from the fractionation procedure is mixed with a water-miscible volatile cellulose acetate solvent to form a dispersion or solution having not more than about 25% cellulose acetate content. Preferably, the concentration of the resulting mixture is between about 15% and about 20%. It is convenient to use the same solvent in this step as was used to dissolve the original cellulose acetate; i. e., methyl acetate or a solvent comprising methyl acetate. However, acetone or methyl ethyl ketone may, for example, be used instead. It is desirable to bring the mixture to the form of a homogeneous solution at this point.

The solution is then mixed with water, preferably by adding the water slowly to the solution with vigorous agitation until the desired water concentration is reached and precipitation is complete. In general, at least sufficient water to precipitate the cellulose acetate flake is added. As a rule, the amount of water added will be no more than that required to get a resulting liquid mixture containing 65% water (disregarding the cellulose acetate content). Controlling the amount of water in this manner affords economy in solvent recovery and, at the same time, provides a flake product having a fairly uniform particle size. The entire amount of water utilized may be added at once to the cellulose acetate solution or the solution may be added to water with agitation. The water may contain a certain amount of solvent, if desired.

After the derived cellulose acetate fraction has been precipitated, the resulting flake material is dried. It is desirable to avoid the use of high drying temperatures by drying under vacuum at a temperature of 50°–90° C. to a water content of less than 3%.

The flake cellulose acetate fraction may be converted to plastic by the usual methods. However, a more direct procedure of obtaining optically clear, colorless plastics involves preparation direct from the gelatinous mass of derived fraction recovered from the fractionation procedure. The gel fraction at this stage contains cellulose acetate solvent and hydrocarbon coagulant, both of which are volatile. A cellulose acetate plasticizer is readily mixed with the gelatinous mass and, upon volatilization of the solvent and precipitant, will in most cases exert sufficient solvent power on the cellulose acetate to form a homogeneous clear plastic. However, it is usually desirable to add active solvents, such as methyl acetate or acetone, to the gelatinous mass to facilitate complete dispersion of the cellulose acetate and plasticizer in the formation of a homogeneous plastic. The plasticized mixture may be cast or extruded in the form of sheets, films, ribbons, and the like, and the volatile materials permitted to evaporate therefrom. The clear articles so obtained may be used as such or, if it is desired to obtain a thicker section, the sheets or films may be welded together under pressure, for example, up to 6000 lb./sq. in with or without the aid of a small amount of solvent and/or heat at temperatures up to about 160° C.

Instead of shaping the plasticized mixture prior to elimination of the solvent, the solvent may be eliminated before shaping. Conveniently, the homogeneous or inhomogeneous mixture of gelled material and plasticizer is milled on a clean differential two-roll plastics mill warmed to permit volatilization of the solvent. Upon substantial elimination of the volatile material, a homogeneous mass may be removed from the rolls in the form of a sheet, which may be cut into a molding powder or welded by pressure into a block, as in the Celluloid process. Likewise, solvent can be eliminated by kneading the mixture under vacuum. It will be appreciated that colorless additives free of suspended particles should be used and that all operations should be carried out in a dust-free atmosphere in order to preserve the properties of the derived cellulose acetate fraction.

Any of the usual cellulose acetate plasticizers, for example, dimethyl phthalate, diethyl phthalate, dimethoxyethyl phthalate, methyl phthalyl ethyl glycolate, ethyl phthalyl ethyl glycolate, p-toluene sulfonamid, tributyl phosphate, dibutyl tartrate, diamyl tartrate, triacetin, tripropionin, diethylene glycol dipropionate, and combinations thereof may be employed. It is preferred that the plasticizer used have a high refractive index. For test purposes dimethyl phthalate is particularly suitable. The amount of plasticizer will depend upon the physical characteristics desired in the resulting plastic and will usually be from about 5% to about 40% of the resulting plastic.

The products resulting from the practice of the processes described herein are substantially colorless plastics of optical clarity and are characteristic in that they have certain definite light transmission properties. They have an excitation purity less than 6% and a visual efficiency greater than 85%. The excitation purity of the plastics prepared in accordance with the invention has been found generally to fall within the range of 6% to 3%, whereas the visual efficiency of the plastics has been found generally to fall within the range of 85% to 90%. These plastics are additionally characterized by an opacity of below 0.50%, as determined by use of a Pulfrich nephelometer. These measurements are on the basis of a ½ inch thick disc of the plastic composition, which for test purposes suitably consists of 67% cellulose acetate and 33% dimethyl phthalate, which disc has been compression molded in a positive mold with stainless steel walls and polished nickel plates for the faces under a pressure of 2000 lb./sq. in. and at a temperature of 160° C. for 15 minutes.

Where the derived cellulose acetate fraction is converted into the dried flake form and plastic masses are prepared therefrom, the excitation purity value of the plastics prepared has, in general, been found to fall within the range of 6% to 3%, and the visual efficiency value of the plastics has been found generally to fall within the range of 82%–88%. Thus, there is a slight loss in brightness when the more indirect method of isolating the flake by means of water precipitation is utilized in arriving at a plastic. However, the opacity as measured by the Pulfrich nephelometer is below 0.50%.

The light transmission characteristics of the plastics resulting from the application of the methods described herein were determined by obtaining a spectral transmission curve of discs prepared by the standard procedure described above, under illumination at normal incidence on a spectrophotometer, and then analyzing the curve so obtained by using the normal color mixture data for the standard observer and the spectral energy distribution of illuminant C, as defined in 1931 by the International Commission on Illumination, hereinafter referred to as I. C. I.

The method as set up by the I. C. I. is based upon the fact that any color can be matched by the additive mixture of three arbitrarily chosen primary colors. The amounts of the three primaries required to match the sample color are known as the X, Y, and Z tristimulus values. Three other quantities, $x$, $y$, and $z$, known as trichromatic coefficients, are defined as follows:

$$x = \frac{X}{X+Y+Z} \quad y = \frac{Y}{X+Y+Z} \quad z = \frac{Z}{X+Y+Z}$$

Since the sum of the three trichromatic coefficients is equal to 1, it follows that any two of these coefficients define a given color, the third being merely the difference between 1 and the sum of the other two.

The trichromatic coefficients of a disc may be readily calculated from the spectrophotometer transmission curve given by the disc. While the $x$ and $y$ trichromatic coefficients, for example, define the results of a color measurement for the purpose of color tolerance specification, it is more convenient to express these in terms of a dominant wave length and excitation purity. These two attributes of color; that is, dominant wave length and excitation purity, are merely a polar coordinate form of the $x$ and $y$ trichromatic coefficients and uniquely define colors of the same brightnesses. Having determined the $x$ and $y$ trichromatic coefficients of a cellulose acetate disc, the dominant wave length and excitation purity of the disc may be determined by plotting the $y$ value as ordinate and the $x$ value as abcissa on a two-dimensional diagram. When this point is connected by a straight line passing through the point represented by illuminant C (a standard illuminant defined by the I. C. I. and which approximates average normal daylight), the line will intersect the locus of points representing the pure spectrum colors at a point whose wave length is known as the dominant wave length of the sample. The ratio of the distance between illuminant point and sample point to the total distance between illuminant point and spectrum locus, expressed in per cent, is known as the excitation purity. In this manner, two attributes of color of a sample; i. e., dominant wave length and excitation purity, are accurately defined. It is convenient to reach an understanding of these two attributes of color to look upon the dominant wave length as defining the hue of a given sample and to regard excitation purity as defining the saturation of color in a given sample. It will be understood that a high excitation purity of a sample indicates a high concentration in the transmitted light of the particular wave length transmitted by that sample, whereas a low excitation purity indicates a low concentration in the transmitted light of the particular wave length transmitted by that sample. In the case of the present invention, the excitation purity value is so low that there is substantially no hue to the sample. In this circumstance, the dominant wave length is not critical in describing the nature of the test piece.

A third attribute of color of a sample is the brightness, or, more accurately, the visual efficiency. It is measured by the Y tristimulus value. The visual efficiency of any given sample may be computed by determing the Y value for a surface having a reflection factor of 1.000 at all wave lengths. The ratio of the Y value of the sample to the Y value of this perfect reflector is the visual efficiency of the sample. In other words, it is the brightness of the sample relative to the brightness of a perfect reflector under the same illumination — in the present case, illuminant C.

Charts for facilitating the conversion of the trichromatic coefficients into dominant wave length and excitation purity, and manner of determining brightness, as well as complete exposition of the method set up by the I. C. I., may be found in the Handbook of Colorimetry, the Technology Press, Massachusetts Institute of Technology, Cambridge, Massachusetts, 1936, prepared under the direction of Arthur C. Hardy.

The Pulfrich opacity values of the plastics of this invention were determined by use of the Pulfrich nephelometer, using a ½-inch thick disc immersed in a glass optical cell. The operation of this device is described in Laboratory Apparatus and Reagents (1931), A. H. Thomas Co., pages 613 to 619.

The products of this invention are of particular utility in the aeronautical industry. Cellulose acetate plastics prepared as described may be employed as sheeting for the manufacture of shaped enclosures for use on all aircraft where a plastic of superior clarity is required. A manufacturer may now equip his planes with plastics which have, at the same time, optimum clarity, true colorlessness, and high impact strength at normal and low temperatures. The major advantage accruing with the use of the cellulose acetate plastics of this invention lies in the attainment of colorless crystal clarity. These plastics are substantially free from color, as is apparent from their light transmission characteristics.

It also has been found that plastics based on the derived cellulose acetate fraction obtained in accordance with this invention have a materially higher impact strength than do plastics made from the original cellulose acetate used as the raw material. Apparently, the colloidal fractions, which impart color and are responsible for scattering of light, have an undesirable effect on impact strength.

Wherever, in the specification and claims, a solution is mentioned, the term is to be considered of sufficient breadth to include a homogeneous mixture which technically may be considered a colloidal dispersion, as well as true solutions.

Wherever, in the specification and claims, the term "aliphatic hydrocarbon" appears, it is used in the sense of including cycloaliphatic hydrocarbons.

All parts and percentage figures in this specification and appended claims are by weight unless otherwise indicated.

The Hercules falling ball method of viscosity determination, as used herein, refers to the method wherein the time of fall in seconds of a $\frac{5}{16}$-inch steel ball through 10 inches of a 20% solution of cellulose acetate in 90 parts of acetone: 10 parts of ethyl alcohol in a 1-inch tube at 25° C. is measured.

What I claim and desire to protect by Letters Patent is:

1. A process for the preparation of a derived cellulose acetate material productive of substantially colorless, optically clear plastics which comprises dissolving cellulose acetate in a solvent of the group consisting of methyl acetate and mixtures of methyl acetate with at least one organic liquid of the group consisting of lower aliphatic alcohols, lower aliphatic ketones, and lower aliphatic alcohol esters of the lower fatty acids, said mixtures containing at least 50% by weight of methyl acetate; adding a saturated aliphatic hydrocarbon of from 3 to 7 carbon atoms, miscible with said solvent and capable of precipitating the cellulose acetate in gelatinous form, in such a manner as to precipitate at least 5% but not all of the cellulose acetate originally dissolved; removing the precipitate formed thereby from the solution; adding additional hydrocarbon precipitant to the remaining cellulose acetate solution in such an amount as to precipitate therefrom not more than about 80% of the cellulose acetate originally dissolved while at the same time leaving at least about 2% of the cellulose acetate originally dissolved in solution; and recovering the resulting precipitate from the solution.

2. A process for the preparation of a derived cellulose acetate material productive of substantially colorless, optically clear plastics which comprises dissolving cellulose acetate in a solvent of the group consisting of methyl acetate and mixtures of methyl acetate with at least one organic liquid of the group consisting of lower aliphatic alcohols, lower aliphatic ketones, and lower aliphatic alcohol esters of the lower fatty acids, said mixtures containing at least 50% by weight of methyl acetate; adding a saturated aliphatic hydrocarbon of from 3 to 7 carbon atoms, miscible with said solvent and capable of precipitating the cellulose acetate in gelatinous form, in such a manner as to precipitate at least 15% but not all of the cellulose acetate originally dissolved; removing the precipitate formed thereby from the solution; adding additional hydrocarbon precipitant to the remaining cellulose acetate solution in such an amount as to precipitate therefrom not more than about 75% of the cellulose acetate originally dissolved while at the same time leaving at least about 5% of the cellulose acetate originally dissolved in solution; and recovering the resulting precipitate from the solution.

3. A process for the preparation of a derived cellulose acetate material productive of substantially colorless, optically clear plastics which comprises dissolving cellulose acetate in a solvent of the group consisting of methyl acetate and mixtures of methyl acetate with at least one organic liquid of the group consisting of lower aliphatic alcohols, lower aliphatic ketones, and lower aliphatic alcohol esters of the lower fatty acids, said mixtures containing at least 50% by weight of methyl acetate; adding pentane in such an amount as to precipitate at least about 15% but not all of the cellulose acetate originally dissolved; after the resulting first precipitate has formed, removing it from the solution; adding additional pentane to the remaining cellulose acetate solution in such an amount as to precipitate therefrom not more than about 75% of the cellulose acetate originally dissolved while at the same time leaving at least about 5% of the cellulose acetate originally dissolved in solution; and after the resulting second precipitate has formed a gelatinous mass, recovering the same from the solution.

4. A process for the preparation of a derived cellulose acetate material productive of substantially colorless, optically clear plastics which comprises dissolving cellulose acetate in a solvent of the group consisting of methyl acetate and mixtures of methyl acetate with at least one organic liquid of the group consisting of lower aliphatic alcohols, lower aliphatic ketones, and lower aliphatic alcohol esters of the lower fatty acids, said mixtures containing at least 50% by weight of methyl acetate; adding hexane in such an amount as to precipitate at least about 15% but not all of the cellulose acetate originally dissolved; after the resulting first precipitate has formed, removing it from the solution; adding additional hexane to the remaining cellulose acetate solution in such an amount as to precipitate therefrom not more than about 75% of the cellulose acetate originally dissolved while at the same time leaving at least about 5% of the cellulose acetate originally dissolved in solution; and after the resulting second precipitate has formed a gelatinous mass, recovering the same from the solution.

5. A process for the preparation of a derived cellulose acetate material productive of substantially colorless, optically clear plastics which comprises dissolving cellulose acetate in methyl acetate; adding a saturated aliphatic hydrocarbon of from 3 to 7 carbon atoms, miscible with methyl acetate and capable of precipitating the cellulose acetate in gelatinous form, in such a manner as to precipitate at least 5% but not all of the cellulose acetate originally dissolved; removing the precipitate formed thereby from the solution; adding additional hydrocarbon precipitant to the remaining cellulose acetate solution in such an amount as to precipitate therefrom not more than about 80% of the cellulose acetate originally dissolved while at the same time leaving at least about 2% of the cellulose acetate originally dissolved in solution; and recovering the resulting precipitate from the solution.

6. A process for the preparation of a derived cellulose acetate flake capable of producing substantially colorless, optically clear plastics which comprises dissolving cellulose acetate in a solvent of the group consisting of methyl acetate and mixtures of methyl acetate with at least one organic liquid of the group consisting of lower aliphatic alcohols, lower aliphatic ketones, and lower aliphatic alcohol esters of the lower fatty acids, said mixtures containing at least 50% by weight of methyl acetate; adding a saturated aliphatic hydrocarbon of from 3 to 7 carbon atoms miscible with said solvent and capable of precipitating the cellulose acetate in gelatinous form, in such an amount as to precipitate at least about 5% but not all of the cellulose acetate originally dissolved; removing the resulting precipitate from the solution; adding additional hydrocarbon precipitant to the remaining cellulose acetate solution in such an amount as to precipitate therefrom not more than about 80% of the cellulose acetate originally dissolved while at the same time leaving at least about 2% of the cellulose acetate originally dissolved in solution; recovering the resulting precipitate from the solution; dissolving the recovered second-mentioned precipitate in a water-miscible volatile cellulose acetate solvent in an amount to form a homogeneous solution having not more than 25% total solids content; mixing the resulting solution with sufficient water to precipitate the derived cellulose acetate flake therein; and recovering and drying the resulting precipitated flake cellulose acetate.

7. A process for the preparation of a derived cellulose acetate flake capable of producing substantially colorless, optically clear plastics which comprises dissolving cellulose acetate in a solvent of the group consisting of methyl acetate and mixtures of methyl acetate with at least one organic liquid of the group consisting of lower aliphatic alcohols, lower aliphatic ketones, and lower aliphatic alcohol esters of the lower fatty acids, said mixtures containing at least 50% by weight of methyl acetate; adding a saturated aliphatic hydrocarbon of from 3 to 7 carbon atoms, miscible with said solvent and capable of precipitating the cellulose acetate in gelatinous form, in such an amount as to precipitate at least about 15% but not all of the cellulose acetate originally dissolved; removing the resulting precipitate from the solution; adding additional hydrocarbon precipitant to the remaining cellulose acetate solution in such an amount as to precipitate therefrom not more than about 75% of the cellulose acetate originally dissolved while at the same time leaving at least about 5% of the cellulose acetate originally dissolved in solution; recovering the resulting precipitate from the solution; dissolving the recovered second-mentioned precipitate in a water-miscible volatile cellulose acetate solvent in an amount to form a homogeneous solution having not more than 25% total solids content; mixing the resulting solution with sufficient water to precipitate the derived cellulose acetate flake therein; and recovering and drying the resulting precipitated flake cellulose acetate.

8. A process for the preparation of a derived cellulose acetate flake capable of producing substantially colorless, optically clear plastics which comprises dissolving cellulose acetate in methyl acetate; adding pentane in such an amount as to precipitate at least about 15% but not all of the cellulose acetate originally dissolved; removing the resulting precipitate from the solution; adding additional pentane to the remaining cellulose acetate solution in such an amount as to precipitate therefrom not more than about 75% of the cellulose acetate originally dissolved while at the same time leaving at least about 5% of the cellulose acetate originally dissolved in the solution; recovering the resulting precipitate from the solution; dissolving the recovered second-mentioned precipitate in a water-miscible volatile cellulose acetate solvent in an amount to form a homogeneous solution having not more than 25% total solids content; mixing the resulting solution with sufficient water to precipitate the derived cellulose acetate flake therein; and recovering and drying the resulting precipitated flake cellulose acetate.

9. A process for the preparation of a derived cellulose acetate flake capable of producing substantially colorless, optically clear plastics which comprises dissolving cellulose acetate in methyl acetate; adding hexane in such an amount as to precipitate at least about 15% but not all of the cellulose acetate originally dissolved; removing the resulting precipitate from the solution; adding additional hexane to the remaining cellulose acetate solution in such an amount as to precipitate therefrom not more than about 75% of the cellulose acetate originally dissolved while at the same time leaving at least about 5% of the cellulose acetate originally dissolved in the solution; dissolving the recovered second-mentioned precipitate in a water-miscible volatile cellulose acetate solvent in an amount to form a homogeneous solution having not more than 25% total solids content; mixing the resulting solution with sufficient water to precipitate the derived cellulose acetate flake therein; and recovering and drying the resulting precipitated flake cellulose acetate.

10. A process for the preparation of a derived cellulose acetate material productive of substantially colorless, optically clear plastics which comprises dissolving cellulose acetate in a solvent of the group consisting of methyl acetate and mixtures of methyl acetate with at least one organic liquid of the group consisting of lower aliphatic alcohols, lower aliphatic ketones, and lower aliphatic alcohol esters of the lower fatty acids, said mixtures containing at least 50% by weight of methyl acetate; adding a saturated aliphatic hydrocarbon of from 3 to 7 carbon atoms, miscible with said solvent and capable of precipitating the cellulose acetate in gelatinous form in such a manner as to precipitate from about 5% to about slightly less than 80%, inclusive, of the cellulose acetate originally dissolved; removing the precipitate formed thereby from the solution; adding additional hydrocarbon precipitant to the remaining cellulose acetate solution in such an amount as to precipitate therefrom some but not more than about 80% of the cellulose acetate originally dissolved while at the same time leaving at least about 2% of the cellulose acetate originally dissolved in solution; and recovering the resulting precipitate from the solution.

JOSEPH WAYNE KNEISLEY.

REFERENCES CITED

The following references are of record in the file of this patent:

UNITED STATES PATENTS

| Number | Name | Date |
|---|---|---|
| 2,024,666 | Staudt et al. | Dec. 17, 1935 |
| 2,048,686 | Conklin | July 28, 1936 |

FOREIGN PATENTS

| Number | Country | Date |
|---|---|---|
| 741,220 | France | Feb. 8, 1933 |

OTHER REFERENCES

Herzog et al.: "Cellulosechemie," vol. 13, pages 25–31.

Ohl: Kunstseide, vol. 12, 1930, pages 468–472.

Morey et al.: J. Phys. Chem., vol. 50, January 1946, pages 12–22. Copy in U. S. Patent Office Scientific Library.

Ind. and Eng. Chem., vol. 30, pages 538 to 543 (1938).

Sookne: Natl. Bur. Stds. Jour. of Research, vol. 29, pages 123 to 130 (1942).

McNally et al.: "The fractional precipitation of cellulose acetate," J. A. C. S. 1929, pp. 3095–3101. 260/230.

Mardles: "Study of the solvents of some cellulose esters," Journal of Society of Chemical Industry, Mar. 29, 1923, vol. XLII, No. 13, pp. 127–136. 18/54E.